United States Patent
Gocho

(10) Patent No.: US 12,199,459 B2
(45) Date of Patent: Jan. 14, 2025

(54) MOVING DEVICE POWER FEEDING DEVICE

(71) Applicant: TOSHIBA TEC KABUSHIKI KAISHA, Tokyo (JP)

(72) Inventor: Katsumi Gocho, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 18/321,805

(22) Filed: May 23, 2023

(65) Prior Publication Data

US 2024/0186805 A1 Jun. 6, 2024

(30) Foreign Application Priority Data

Dec. 5, 2022 (JP) ................. 2022-194384

(51) Int. Cl.
*H02J 7/00* (2006.01)
*B62B 3/14* (2006.01)
*B62B 5/00* (2006.01)

(52) U.S. Cl.
CPC .............. *H02J 7/0042* (2013.01); *B62B 3/14* (2013.01); *B62B 5/0096* (2013.01)

(58) Field of Classification Search
CPC ......... H02J 7/0042; B62B 3/14; B62B 5/0096
USPC ....................................... 307/9.1
See application file for complete search history.

(56) References Cited

U.S. PATENT DOCUMENTS

| 5,361,871 | A | 11/1994 | Gupta et al. |
| 2006/0293968 | A1 | 12/2006 | Brice et al. |
| 2008/0231432 | A1 | 9/2008 | Stawar et al. |
| 2022/0212703 | A1* | 7/2022 | Enomoto ............ H02J 50/12 |
| 2022/0376557 | A1* | 11/2022 | Arai .................. B62B 5/00 |

OTHER PUBLICATIONS

Extended European Search Report for European Patent Application No. 23182724.8 dated May 6, 2024.

* cited by examiner

*Primary Examiner* — Hal Kaplan
(74) *Attorney, Agent, or Firm* — Amin, Turocy & Watson, LLP

(57) ABSTRACT

A terminal accommodating portion is disposed on a front side or a rear side in a traveling direction of the wheel that travels between the pair of side walls of a rail, and is attached to the moving device. A power receiving terminal receives electric power to be fed to a secondary battery, and is provided to be movable along a width direction. A terminal receiving portion is groove-shaped and is provided in one side wall of the rail, and the power receiving terminal configured to move along the width direction of the moving device is inserted into the terminal receiving portion. A power transmitting terminal is disposed on a surface, inside the terminal receiving portion, on which the power receiving terminal slides during movement, is present over a longitudinal direction of the rail, and comes into contact with and transmit power to the power receiving terminal.

18 Claims, 8 Drawing Sheets

MOVING DEVICE POWER FEEDING DEVICE

CROSS-REFERENCE TO RELATED APPLICATION

This application is based upon and claims the benefit of priority from Japanese Patent Application No. 2022-194384, filed on Dec. 5, 2022, the entire contents of which are incorporated herein by reference.

FIELD

Embodiments of the present disclosure relate to a moving device power feeding device.

BACKGROUND

In recent years, a device called a cart point of sale (POS) device or the like is used. The cart POS includes a tablet type or smartphone type mobile terminal on a shopping cart in the related art, and the mobile terminal receives a registration operation or the like of a commodity performed by a customer. Such a device such as the cart POS requires electric power for operating the mobile terminal, and thus a secondary battery is mounted thereon. The secondary battery is charged when the device is stacked in a predetermined standby place.

For example, PTL 1 discloses a technique of charging a secondary battery at a predetermined standby place by non-contact charging. However, when the non-contact charging is performed, it is difficult to implement sufficient charging unless a facing position between a facility on a side of transmitting electric power in a non-contact manner and a side of receiving electric power is appropriate, and various devices for appropriately setting the facing position are required.

The shopping carts are stacked at a predetermined standby place, and are provided so as to be freely used by an unspecified large number of customers. In addition, there is also a case where the shopping carts are stacked by a last-in-first-out method. Therefore, the cart POS with relatively sufficient charge is not always taken out by the customer in order.

In the above description, the cart POS is described as an example, but there is a similar problem as long as a device is a moving body formed to be movable with a wheel or the like and is a device (moving device) that operates by electric power supply from the mounted secondary battery. As such a device, in addition to the cart POS, for example, a self-traveling robot device, a handcart type device having a function (assist function) of assisting a force for moving, and the like are considered.

DETAILED DESCRIPTION

In general, according to one embodiment, a moving device power feeding device that can easily implement positional accuracy for feeding electric power without depending on a handling skill when electric power is fed to a secondary battery mounted on a device formed to be movable with a wheel or the like, is provided.

A moving device power feeding device according to an embodiment includes a rail, a terminal accommodating portion, a power receiving terminal, a terminal receiving portion, and a power transmitting terminal. The rail includes a passage through which a wheel of a moving device passes, and a pair of side walls erected with the passage interposed therebetween. The terminal accommodating portion is container-shaped, is disposed on a front side or a rear side in a traveling direction of the wheel that travels between the pair of side walls, and is attached to the moving device. The power receiving terminal is configured to receive electric power to be fed to a secondary battery mounted on the moving device, and is provided to be movable along a width direction of the moving device between a position where the power receiving terminal is accommodated in the terminal accommodating portion and a position where the power receiving terminal is separated from the terminal accommodating portion. The terminal receiving portion is groove-shaped, is provided in one of the side walls, and the power receiving terminal configured to move along the width direction of the moving device is inserted into the terminal receiving portion. One or more power transmitting terminals are disposed on a surface, inside the terminal receiving portion, on which the power receiving terminal slides during movement, are present over a longitudinal direction of the rail, and are configured to come into contact with the power receiving terminal to transmit electric power to the power receiving terminal.

First Embodiment

Figure 1:
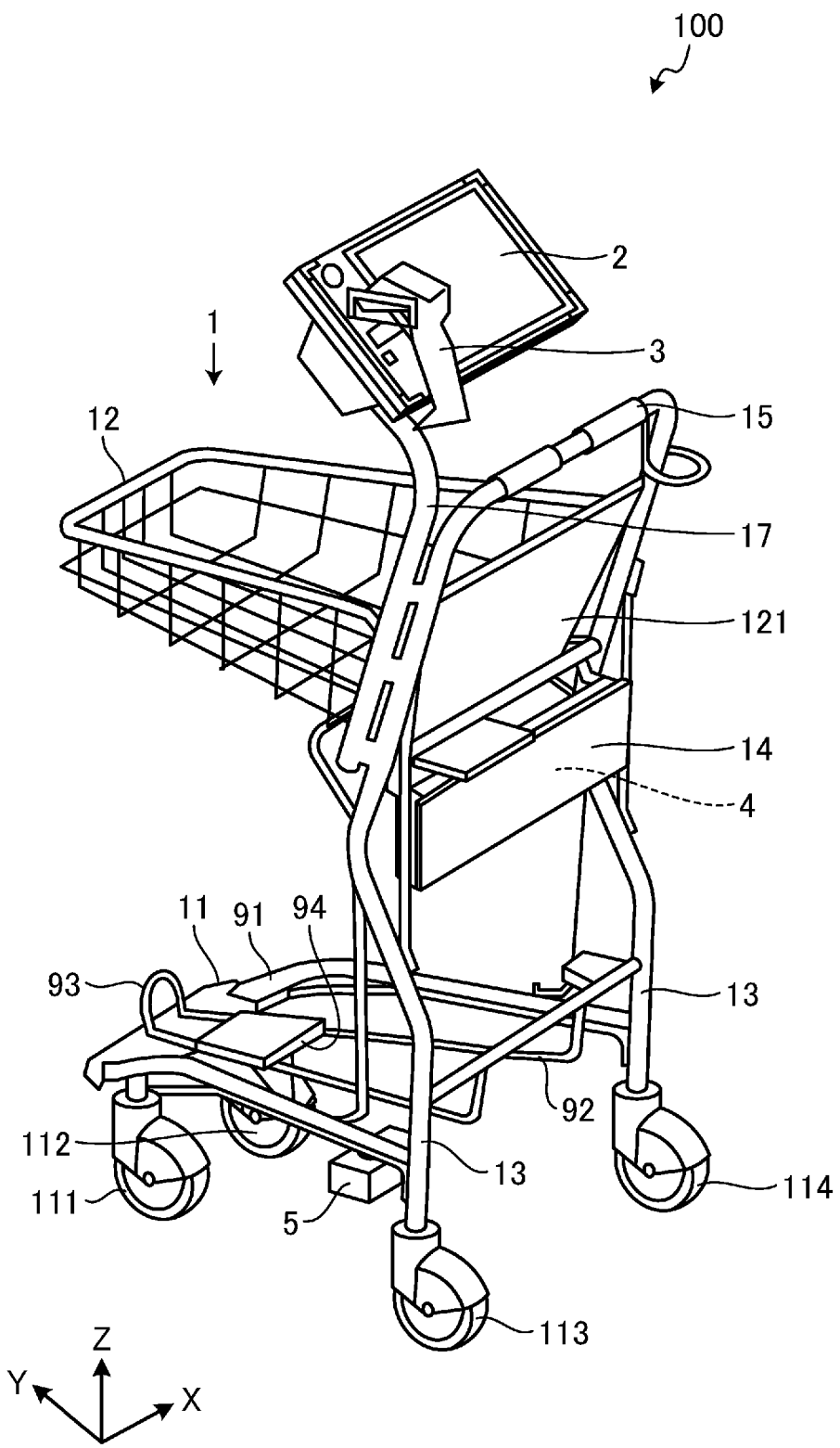
FIG. 1 is a perspective view showing an example of an appearance and a structure of a moving device according to an embodiment.

An embodiment of a moving device power feeding device will be described with reference to the drawings. FIG. 1 is a perspective view showing an example of an appearance and a structure of a moving device according to the embodiment. A cart POS 100 is an example of the moving device, and includes a cart 1, a self-service terminal 2, a handy scanner 3, a secondary battery 4, and a power receiving unit 5.

A three-dimensional coordinate system for facilitating understanding of the structure is added to each drawing. A width direction of the cart 1 is an X-axis direction, a front-rear direction of the cart 1 is a Y-axis direction, and a height direction of the cart 1 is a Z-axis direction. A positive direction of a Y axis is a forward direction of the cart 1, and a negative direction of the Y axis is a backward direction of the cart 1. A positive direction of an X axis is a direction from left to right of a customer who operates the cart 1. A positive direction of a Z axis is a direction from bottom to top.

The cart 1 is a shopping cart that is moved by being pushed by an operator's hand, is provided in a retail store such as a supermarket or a shopping mall, and is used by a customer in the store to convey commodities. The cart 1 includes a base portion 11, a holding portion 12, a vertical frame 13, a holder 14, a handle portion 15, and a support column 17. A side where the handle portion 15 is located is a rear side of the cart 1.

The base portion 11 includes wheels (a pair of front wheels 111 and 112 and a pair of rear wheels 113 and 114). A distance between the front wheels 111 and 112 is smaller than a distance between the rear wheels 113 and 114. A shaft of each wheel is supported by a fork including a turning portion. Accordingly, a head of each wheel can be swung by turning around an axis positioned at a position twisted with the shaft.

The base portion 11 includes an outer frame portion 91, an inner frame portion 92, an abutting portion 93, and a stopper 94.

The outer frame portion 91 has a substantially U-shape, includes a bent portion on a front side, and the outer frame portion 91 on a rear side is open. The above-described wheels (the pair of front wheels 111 and 112 and the pair of rear wheels 113 and 114) are provided at four corners of the outer frame portion 91.

The inner frame portion 92 is provided at a position surrounded by the outer frame portion 91, and similarly to the outer frame portion 91, has a substantially U-shape, includes a bent portion on the front side, and the inner frame portion 92 on the rear side is open. The bent portion of the inner frame portion 92 is bent so as to protrude upward, and serves as the abutting portion 93. A dimension of the inner frame portion 92 in the front-rear direction is approximately the same as that of the outer frame portion 91, but a width of the inner frame portion 92 is narrower than that of the outer frame portion 91. Further, the inner frame portion 92 is formed with a dimension that enables a bottom of a commodity basket for accommodating commodities to be placed.

The outer frame portion 91 and the inner frame portion 92 are provided such that the widths increase and heights from a floor surface increase from the front side toward the rear side. Accordingly, the inner frame portion 92 of the subsequent cart 1 can be inserted into the inner frame portion 92, and the carts 1 can be stacked forward and rearward.

The abutting portion 93 has a function of pressing a front end portion of the commodity basket placed on the inner frame portion 92 and restricting, when the plurality of carts 1 are stacked, an interval between the carts 1 by interfering with the stopper 94 of the base portion 11 of the front cart 1 in a state of abutting the stopper 94.

The stopper 94 is a target against which the abutting portion 93 abuts. A position of the stopper 94 is set so as to make the distance between the front and rear carts appropriate.

The holding portion 12 is a basket-shaped container having an open upper surface, which is provided above the base portion 11, and holds packages (commodities to be purchased by a customer). The holding portion 12 includes, on the rear side, a rear plate 121 whose upper side is held in a manner of being rotatable toward an inside of the basket-shaped holding portion 12. The rear plate 121 can be rotated by being pushed from the rear to the front, so that the rear plate 121 can be flipped up. Accordingly, the holding portion 12 of the subsequent cart 1 can be inserted into the front holding portion 12 by pushing the rear plate 121 of the front cart 1 against a front end portion of the holding portion 12 of the subsequent cart 1. The bottom of the holding portion 12 gradually decreases in width and increases in height from the rear side to the front side. Accordingly, as shown in FIG. 1, when the carts 1 are accumulated (stacked) forward and rearward, the front and rear holding portions 12 are in a nested state.

The vertical frame 13 connects the base portion 11 and the holding portion 12, and supports the holding portion 12, so that the holding portion 12 is positioned above the base portion 11.

It should be noted that the cart 1 may not include the basket-shaped container (holding portion 12), for example, the cart 1 may include a basket receiving unit for receiving a commodity basket for accommodating commodities, and the basket receiving unit and the commodity basket may function as the holding portion 12.

The holder 14 is positioned below the holding portion 12 and accommodates the secondary battery 4. The secondary battery 4 is a battery that stores electric power received by the power receiving unit 5. The electric power stored in the secondary battery 4 is consumed to operate the self-service terminal 2.

The handle portion 15 is a portion held by a customer who moves the cart 1, and is provided on an upper portion of the vertical frame 13. Here, in the present embodiment, a handle portion 15 side is the rear side, and a protruding direction of the holding portion 12 protruding from the handle portion 15 is the front side.

In addition, the support column 17 is attached to the vertical frame 13, and supports the self-service terminal 2 that registers a commodity to be sold, so that the self-service terminal 2 is positioned above the handle portion 15.

The self-service terminal 2 is a tablet information processing device that is attached to the cart 1, displays information for a customer, and receives an operation corresponding to a display content. The self-service terminal 2 functions as a sales registration device, displays information of a commodity identified by a commodity code read via the handy scanner 3, and performs registration.

The handy scanner 3 reads the commodity code and outputs the commodity code to the self-service terminal 2. The commodity code is information (identification information) with which a commodity can be identified (or specified). The commodity code is indicated on a surface of a commodity in a form of a bar code or the like. The commodity identification is not limited to the commodity identification performed by the handy scanner 3 reading the bar code in the present embodiment, and the commodity may be identified by a technique (object recognition) of identifying an object from a feature of a surface of the object.

The self-service terminal 2 operates with electric power charged in the secondary battery 4 accommodated in the holder 14. The power receiving unit 5 receives electric power transmitted from a power transmitting unit 6 (see FIG. 2, described later) and transmits the electric power to the secondary battery 4.

Figure 2:
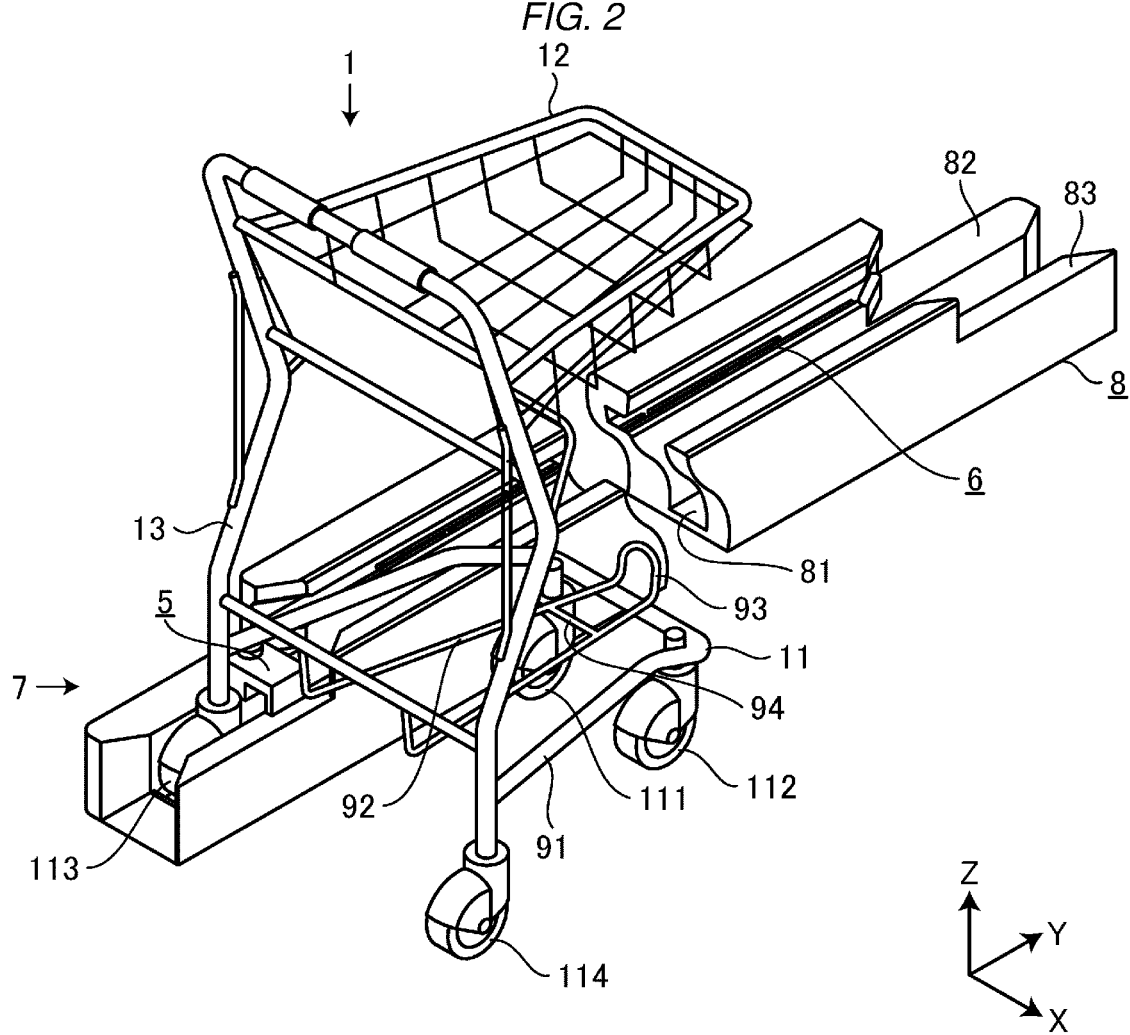
FIG. 2 is a perspective view showing an example of an appearance and a structure of a moving device power feeding device.

FIG. 2 is a perspective view showing an example of an appearance and a structure of a moving device power feeding device 7. The moving device power feeding device 7 includes a rail 8, the power receiving unit 5, and the power transmitting unit 6. The rail 8 is provided at a place where the cart POS's 100 are stacked, and holds the cart POS's 100. In addition, in the present embodiment, a traveling direction of the cart POS 100 held by the rail 8 is one-way, and stacking is performed in a first-in-first-out manner. The rail 8 includes a passage 81 through which one rear wheel 113 of the cart POS 100 passes, and a pair of side walls 82 and 83 erected with the passage 81 interposed therebetween.

The side walls 82 and 83 of the rail 8 face each other across the rear wheel 113 in an axial direction. The traveling direction of the rear wheel 113 is determined by the side walls 82 and 83, so that traveling directions of all the wheels 111 to 114 are determined in one direction, and the cart 1 travels along a direction (longitudinal direction) guided by the rails 8 without meandering.

Figure 3:
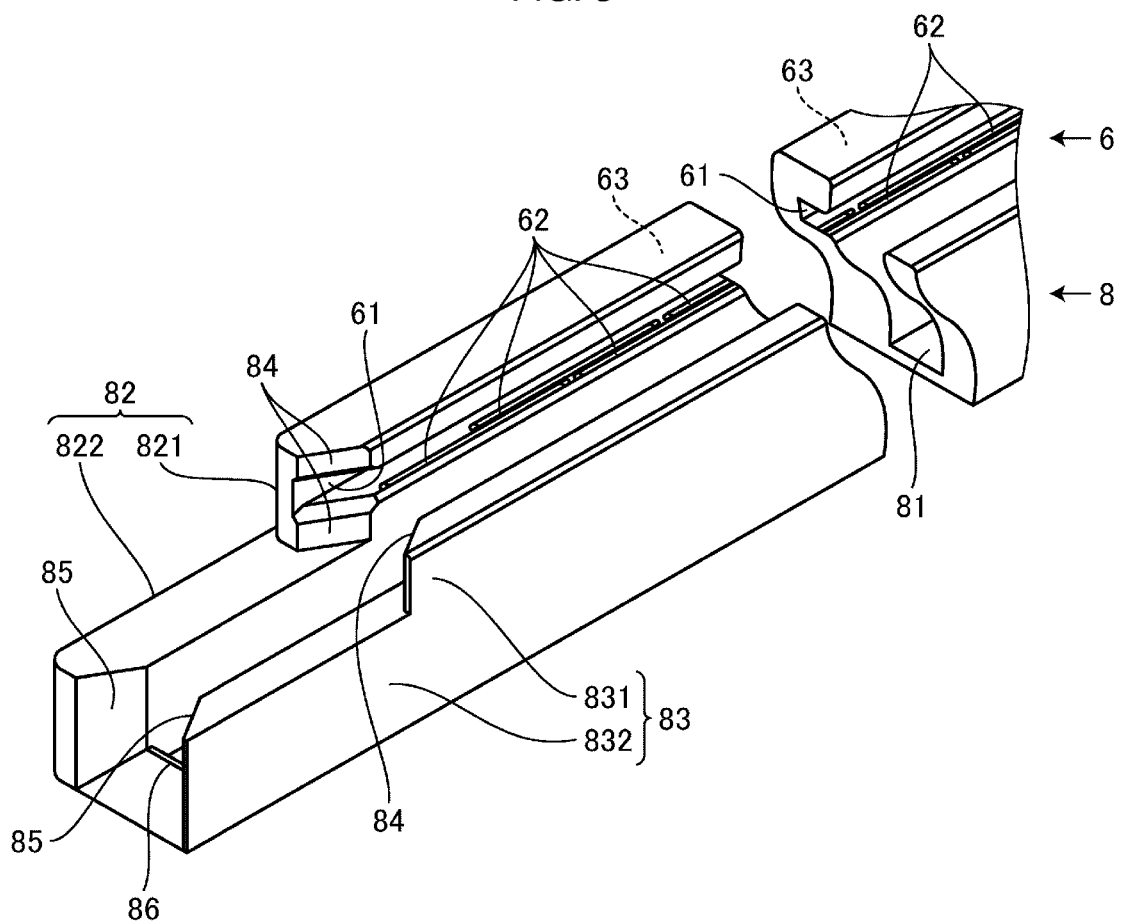
FIG. 3 is a perspective view showing an example of a structure on a power transmission side.

FIG. 3 is a perspective view showing an example of structures of the rail 8 and the power transmitting unit 6. The side wall 82 of the rail 8 includes an upper step portion 821 and a lower step portion 822. Similarly, the side wall 83 also includes an upper step portion 831 and a lower step portion 832. The lower step portions 822 and 832 are positioned below the upper step portions 821 and 831. That is, the rail 8 is divided into two steps, the upper step portions 821 and 831 and the lower step portions 822 and 832. End portions of the upper step portions 821 and 831 are positioned on the lower step portions 822 and 832, so that a stepwise level difference is formed between the end portions of the upper step portions 821 and 831 and the lower step portions 822 and 832.

The lower step portions 822 and 832 restrict movement of the rear wheel 113 in the width direction (X-axis direction). The upper step portions 821 and 831 restrict movement of a terminal accommodating portion 51 (see FIG. 4, described later) constituting the power receiving unit 5 in the width direction. End portions of the lower step portions 822 and 832 protrude longer along the longitudinal direction of the rail 8 than the end portions of the upper step portions 821 and 831.

The end portions of the upper step portions 821 and 831 are largely chamfered to form inclined surfaces 84. Similarly, the end portions of the lower step portions 822 and 832 are also largely chamfered to form inclined surfaces 85. The inclined surfaces 84 and 85 are inclined such that end sides are wider and back sides are narrower. The inclined surfaces 84 guide the terminal accommodating portion 51. The inclined surfaces 85 guide the wheel 113.

The rail 8 includes a protruding portion 86 protruding upward at an inlet/outlet of the passage 81. A height of the protruding portion 86 is less than a radius of the wheel 113.

Figure 4:
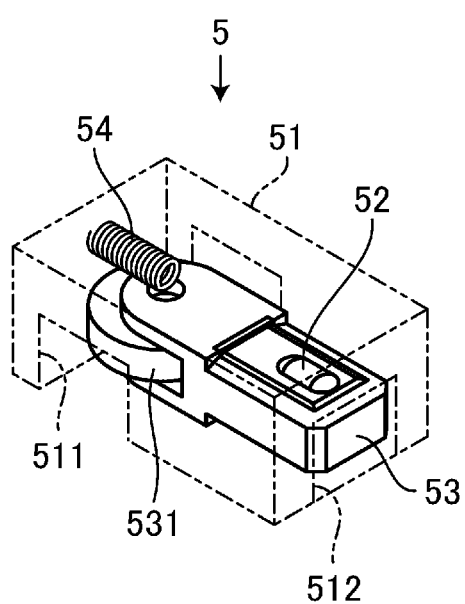
FIG. 4 is a perspective view showing an example of a structure on a power receiving side.

FIG. 4 is a perspective view showing an example of a structure of the power receiving unit 5. The power receiving unit 5 includes the terminal accommodating portion 51, a power receiving terminal 52, an arm portion 53, and a biasing member 54. The terminal accommodating portion 51 is a container-shaped member, and accommodates the power receiving terminal 52, the arm portion 53, and the biasing member 54. The terminal accommodating portion 51 is disposed on the front side of the rear wheel 113 and attached to the cart POS 100. Here, the "front side" is a front side of the cart 1 in the front-rear direction, and is a front side in the traveling direction when the rear wheel 113 travels between the pair of side walls 82 and 83.

Although the terminal accommodating portion 51 is disposed on the front side of the rear wheel 113 in the present embodiment, in practice, if the terminal accommodating portion 51 is disposed on the rear side of the rear wheel 113 without being disposed on a width side (right and left adjacent positions), the power receiving unit 5 can function similarly. However, it is considered that the power receiving unit 5 is protected on the front side of the rear wheel 113 as compared with being disposed on the rear side, so that inconvenience such as breakage is less likely to occur.

The power receiving terminal 52 receives electric power fed from the power transmitting unit 6. The electric power received by the power receiving terminal 52 is stored in the secondary battery 4 mounted on the cart POS 100. The power receiving terminal 52 is attached to one end portion of the arm portion 53. The power receiving terminal 52 according to the present embodiment is constituted by a pair of upper and lower configurations in which a positive electrode terminal is disposed on an upper surface of the arm portion 53 that enters and leaves the terminal accommodating portion 51 and a negative electrode terminal is disposed on a lower surface thereof.

The arm portion 53 to which the power receiving terminals 52 are attached is provided to be movable along the width direction (X-axis direction) of the cart POS 100 between a position where the arm portion 53 is accommodated in the terminal accommodating portion 51 and a position where the power receiving terminals 52 are separated from the terminal accommodating portion 51. The biasing member 54 is, for example, a helical spring, and biases the arm portion 53 in a direction in which the power receiving terminals 52 at the position of being separated from the terminal accommodating portion 51 are returned (drawn) into the terminal accommodating portion 51. A roller 531 is provided in an end portion of the arm portion 53 on a side that is pulled by the biasing member 54 (that is, an end portion on an opposite side from the end portion where the power receiving terminals 52 are provided).

The terminal accommodating portion 51 is provided with a groove-shaped recessed portion 511. The recessed portion 511 is an example of an engaging portion that is provided in the terminal accommodating portion 51 slidably engages with an upper side of the side wall 83. When the rear wheel 113 of the cart 1 passes through the passage 81 of the rail 8, the upper step portion 831 of the side wall 83 is slidably fitted into the recessed portion 511. Accordingly, the terminal accommodating portion 51 is slidable in the longitudinal direction of the rail 8 and is not movable in the width direction of the rail 8.

Further, the terminal accommodating portion 51 is provided with an opening portion 512 through which the end portion of the arm portion 53 to which the power receiving terminals 52 are attached enters and leaves.

Next, referring back to FIG. 3, the power transmitting unit 6 includes a terminal receiving portion 61 and power transmitting terminals 62 and 63. The terminal receiving portion 61 is a groove-shaped portion provided in one side wall 82, and is a portion into which the power receiving terminals 52 moving along the width direction of the cart POS 100 are inserted.

The power transmitting terminals 62 and 63 come into contact with the power receiving terminals 52 to transmit electric power to the power receiving terminals 52, and are disposed on a surface, inside the terminal receiving portion 61, on which the power receiving terminals 52 slide during movement, and are present over substantially the entire region of the rail 8 in the longitudinal direction.

The power transmitting terminals 62 and 63 face each other vertically, and the power transmitting terminal 62 disposed on a lower surface of the terminal receiving portion 61 is a positive electrode terminal, and the power transmitting terminal 63 disposed on an upper surface is a negative electrode terminal. The polarities of the power transmitting terminals 62 and 63 may be reversed. In this case, the polarities of the power receiving terminals 52 are also reversed.

The power transmitting terminals 62 and 63 may be continuous in the longitudinal direction of the rail 8, but different from the power transmitting terminals according to the present embodiment, a plurality of power transmitting terminals 62 and 63 each having a predetermined length are disposed in the longitudinal direction and disposed in parallel. Further, the adjacent power transmitting terminals 62 and 63 are alternately disposed in a staggered manner, and thus the power receiving terminals 52 always intersect (come into contact with) one or more power transmitting terminals 62 and 63 without being influenced by a portion (pause) where there is no power transmitting terminal 62. When the power transmitting terminals 62 are disposed in the staggered manner, it is easier to correspondingly customize a length of the rail 8 as compared with the case where the power transmitting terminals 62 and 63 are continuous in the longitudinal direction.

Figure 5:
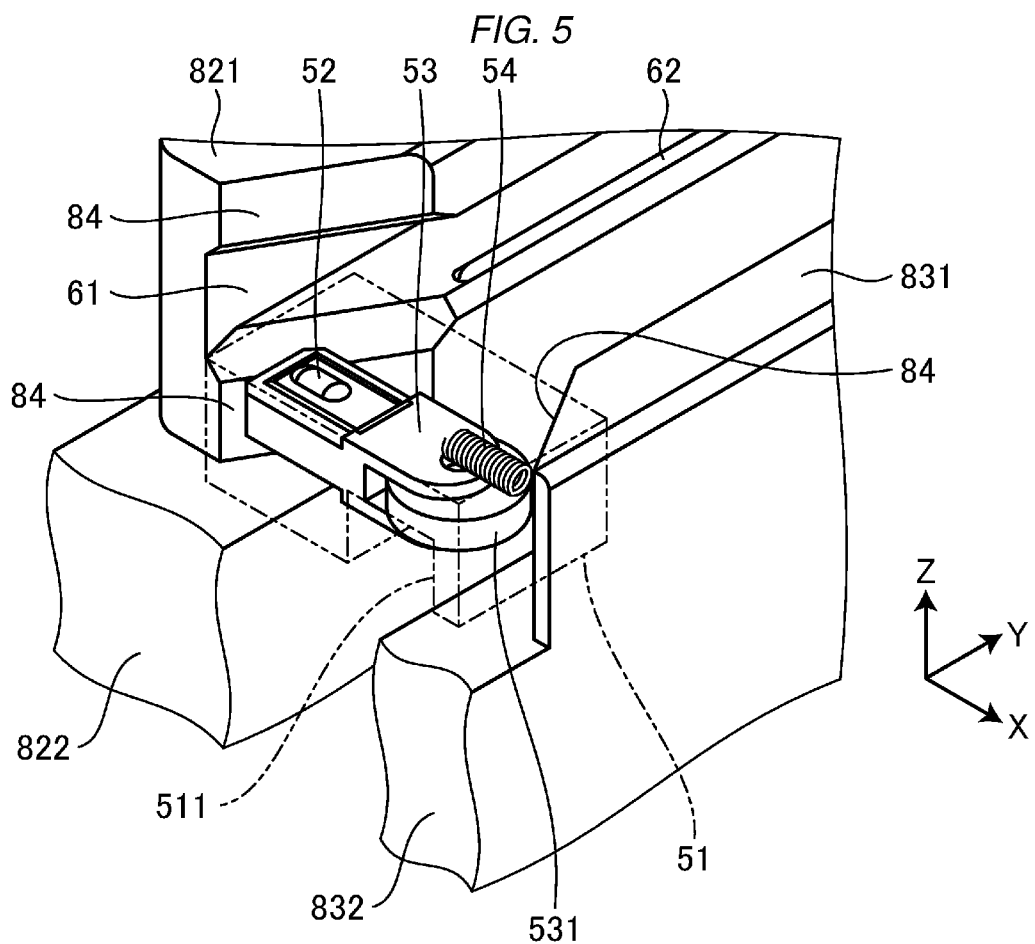
FIG. 5 is a perspective view illustrating transition of relative positions of a power receiving terminal, a terminal accommodating portion, a terminal receiving portion, and a power transmitting terminal.
Figure 6:
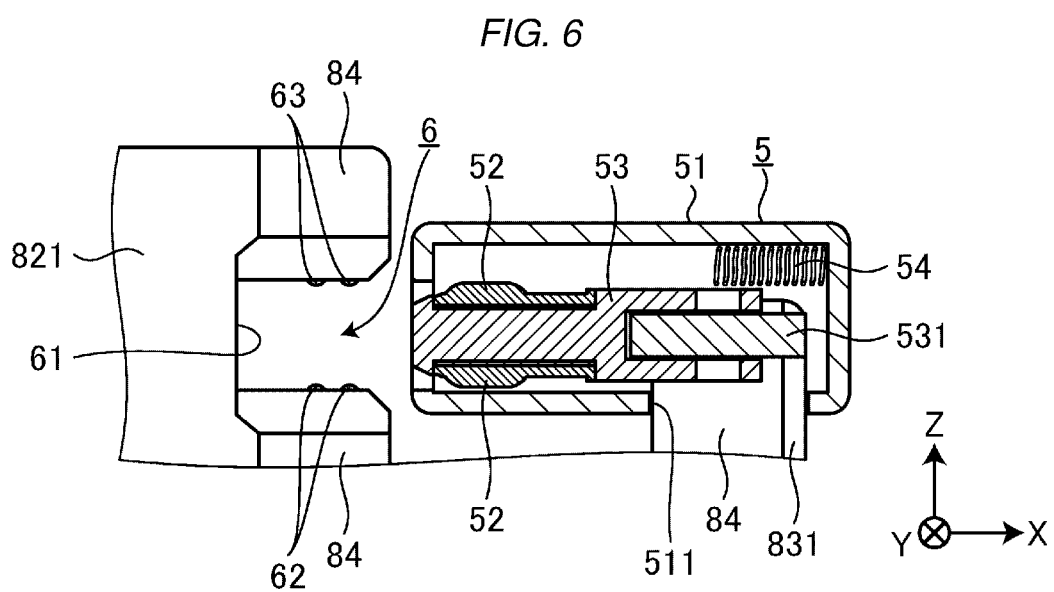
FIG. 6 is a cross-sectional view illustrating the transition of the relative positions of the power receiving terminal, the terminal accommodating portion, the terminal receiving portion, and the power transmitting terminal.
Figure 7:
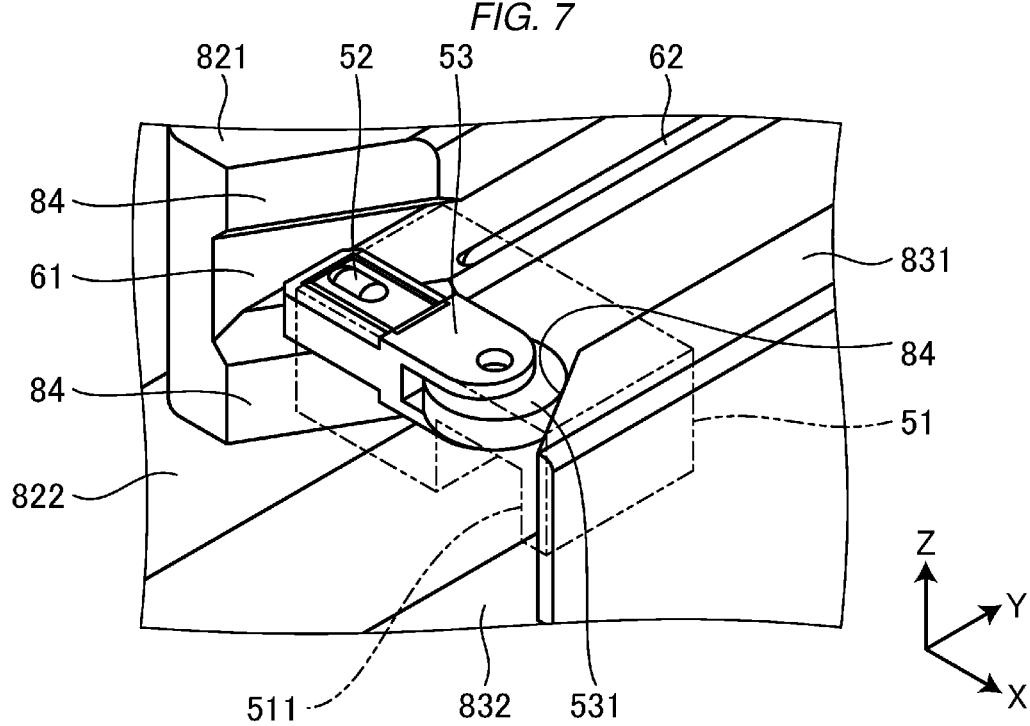
FIG. 7 is a perspective view illustrating the transition of the relative positions of the power receiving terminal, the terminal accommodating portion, the terminal receiving portion, and the power transmitting terminal.
Figure 8:
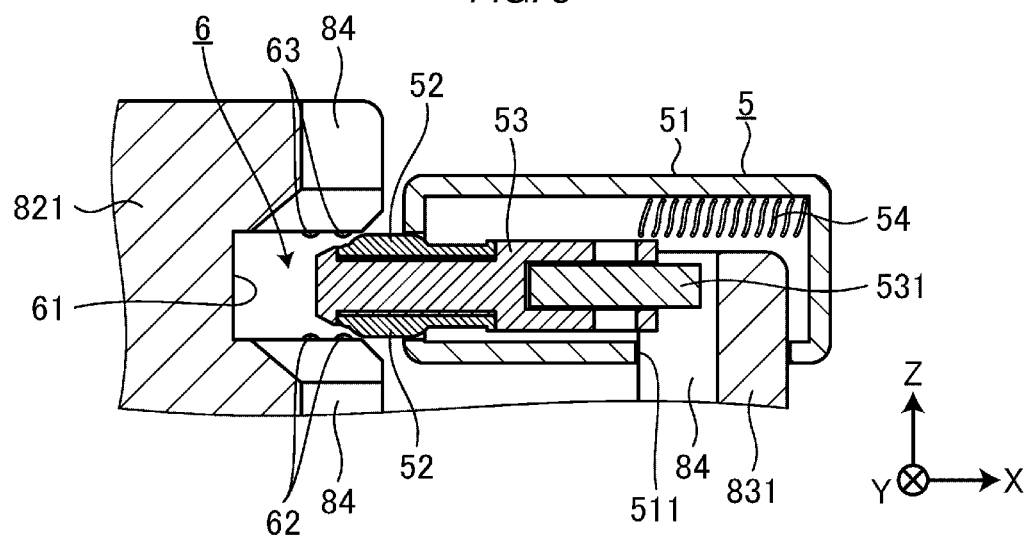
FIG. 8 is a cross-sectional view illustrating the transition of the relative positions of the power receiving terminal, the terminal accommodating portion, the terminal receiving portion, and the power transmitting terminal.
Figure 9:
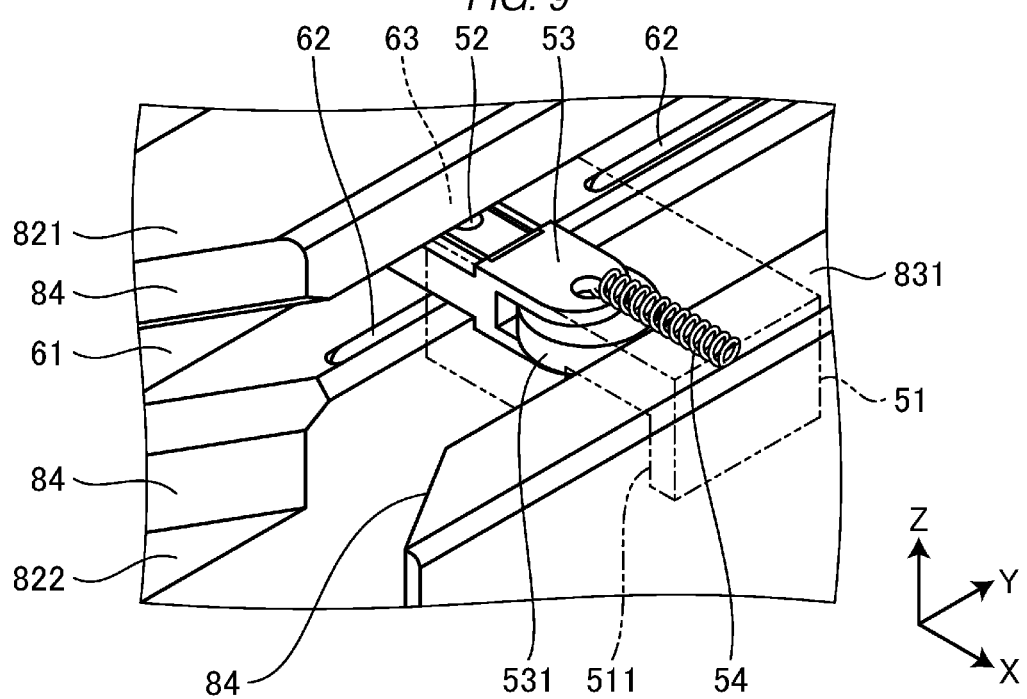
FIG. 9 is a perspective view illustrating the transition of the relative positions of the power receiving terminal, the terminal accommodating portion, the terminal receiving portion, and the power transmitting terminal.
Figure 10:
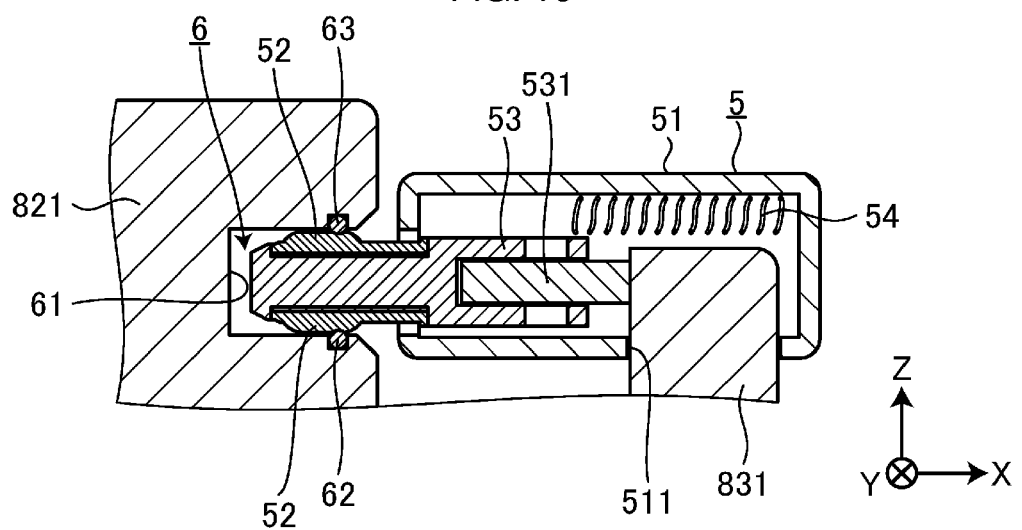
FIG. 10 is a cross-sectional view illustrating the transition of the relative positions of the power receiving terminal, the terminal accommodating portion, the terminal receiving portion, and the power transmitting terminal.

FIGS. 5 to 10 are diagrams illustrating transition of relative positions of the power receiving terminals 52, the terminal accommodating portion 51, the terminal receiving portion 61, and the power transmitting terminals 62 and 63. FIG. 5 is a perspective view of a first stage of the transition, and FIG. 6 is a cross-sectional view of the first stage of the transition. FIG. 7 is a perspective view of a second stage of the transition, and FIG. 8 is a cross-sectional view of the second stage of the transition. FIG. 9 is a perspective view of a third stage of the transition, and FIG. 10 is a cross-sectional view of the third stage of the transition.

The terminal accommodating portion 51 approaches the upper step portion 831 of the side wall 83 as the wheel 113 travels forward on the passage 81 (travels in the positive direction of the Y axis), and the roller 531 comes into contact with the inclined surface 84 in the first stage shown in FIGS. 5 and 6. At this time, a distal end portion of the upper step portion 831 is inserted into the recessed portion 511.

Next, in the second stage shown in FIGS. 7 and 8, when the terminal accommodating portion 51 moves as the wheel 113 moves further forward, the roller 531 rolls on the inclined surface 84 accordingly, and thus, the arm portion 53 moves in the negative direction of the X axis against a biasing force of the biasing member 54. As the roller 531 rolls on the inclined surface 84 and travels, the power receiving terminals 52 are gradually and deeply inserted into the terminal receiving portion 61.

Next, in the third stage shown in FIGS. 9 and 10, when the terminal accommodating portion 51 moves as the wheel 113 moves further forward, the roller 531 rolls and moves forward on an inner surface (surface facing the upper step portion 821) of the upper step portion 831 after passing through the inclined surface 84. In this stage, the power receiving terminals 52 provided on the end portion of the arm portion 53 on an opposite side are completely separated from the terminal accommodating portion 51 and completely inserted into the terminal receiving portion 61. The pair of power receiving terminals 52 inserted into the terminal receiving portion 61 are in contact with the power transmitting terminals 62 and 63 on the lower surface and the upper surface of the terminal receiving portion 61.

As described above, according to the present embodiment, the power transmitting terminals 62 and 63 and the power receiving terminals 52 can be brought into contact with each other by inserting the wheel 113 into the rail 8, so that electric power can be fed from the power transmitting unit 6 to the power receiving unit 5.

With such a moving device power feeding device 7, when electric power is fed to the secondary battery 4 mounted on the cart POS 100 that can be moved with the wheels 111 to 114, positional accuracy for feeding electric power can be easily implemented without depending on a handling skill. That is, even if an operator of the cart 1 is not aware of a relative position between the power receiving terminals 52 and the power transmitting terminals 62 and 63, the power receiving terminals 52 and the power transmitting terminals 62 and 63 can be reliably brought into contact with each other by inserting the wheel 113 of the cart 1 into the rail 8. Accordingly, while the cart POS 100 is held by the rail 8, the secondary battery 4 can be reliably charged without a failure such as insufficient facing of the terminals.

Further, in the present embodiment, a contact direction (vertical direction) between the power receiving terminals 52 and the power transmitting terminals 62 and 63 intersects a movement direction (width direction) of the power receiving terminals 52. With such a structure, it is possible to loosen the positional accuracy required to bring the terminals into contact with each other as compared with a case where the contact direction and the movement direction coincide with each other (for example, both are the width direction). Further, for example, when the power receiving terminal 52 has a property of being elastically bent in the vertical direction, it is possible to make the state of being in contact with the power transmitting terminals 62 and 63 more reliable. Therefore, according to the structure of the present embodiment, for example, as compared with a structure in which the terminals are brought into contact with each other in a butted state, it is possible to reduce a risk of a contact failure of the terminals and improve reliability of implementing the charging.

Further, since ends of the lower step portions 822 and 832 protrude longer than ends of the upper step portions 821 and 831, the power receiving terminals 52 can be taken in and out in a state where the traveling direction of the wheel 113 does not shake. Accordingly, it is possible to prevent inconvenience such as the power receiving unit 5 being damaged by hitting the rail 8.

Figure 11:
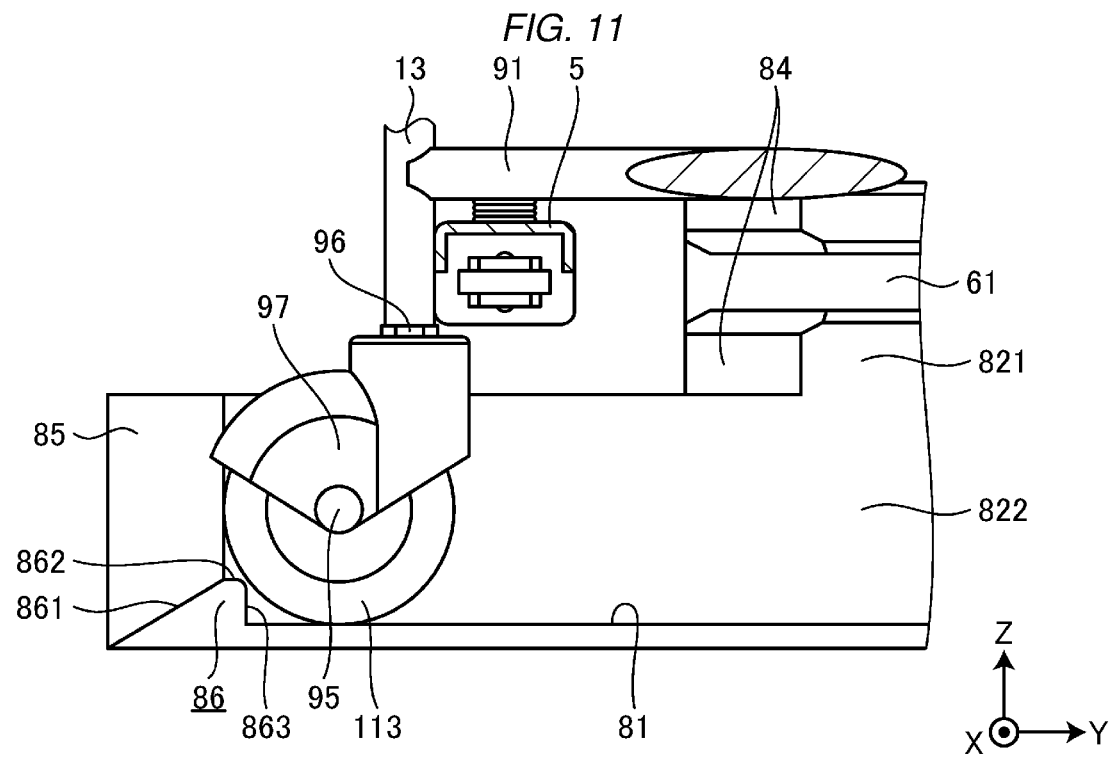
FIG. 11 is a cross-sectional view illustrating a relationship between a wheel and a protruding portion provided in a rail.
Figure 12:
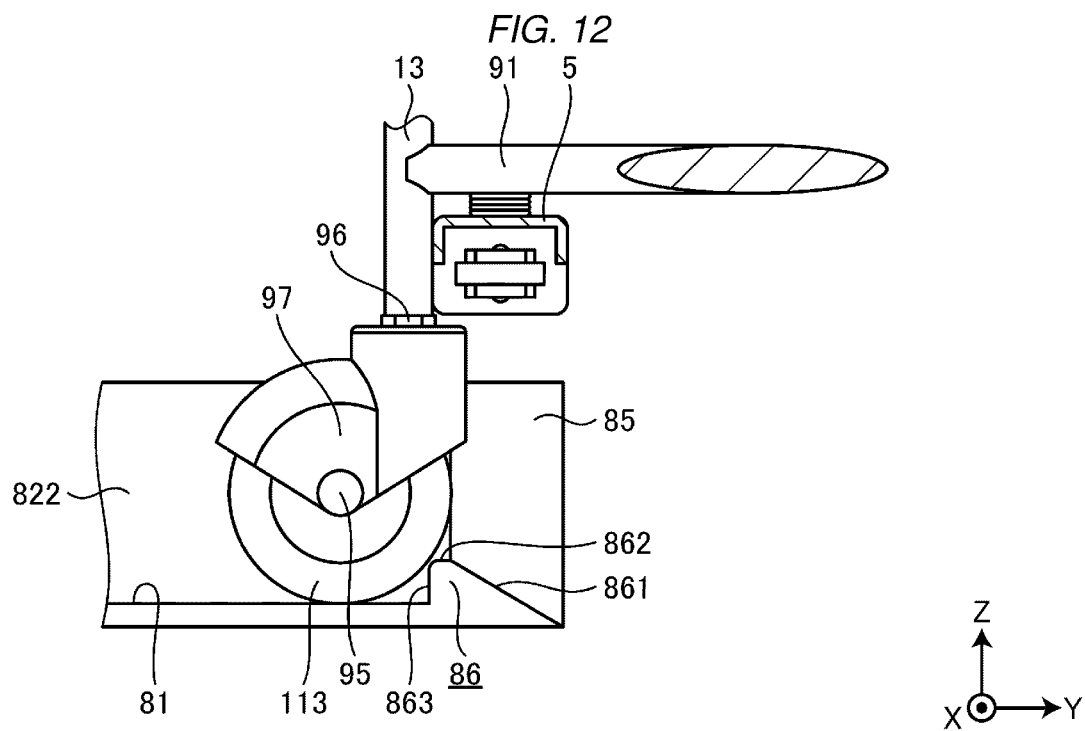
FIG. 12 is a cross-sectional view illustrating the relationship between the wheel and the protruding portion provided in the rail.

Here, since the rail 8 includes the protruding portion 86 at the inlet/outlet of the passage 81, the rail 8 is formed such that the cart POS 100 is first-in-first-out. FIGS. 11 and 12 are cross-sectional views illustrating a relationship between the wheel 113 and the protruding portion 86 provided in the rail 8.

First, a shaft 95 of the wheel 113 is supported by a fork 97 including a turning portion 96, which is briefly touched upon in the description of the above wheels 111 to 114. An axis of the turning portion 96 and the shaft 95 are in a twisted position. As a result, a head of the wheel 113 can be swung.

The protruding portion 86 protrudes upward at the inlet/outlet of the passage 81. As described above, the height of the protruding portion 86 is less than the radius of the wheel 113. In addition, the protruding portion 86 includes an inclined surface 861 that gradually increases in height from an end of the rail 8 toward a back, and a level difference 863 that falls substantially vertically from a top portion 862 to the passage 81. Such a protruding portion 86 functions as a slight degree wheel stopper, allows forward movement of the wheel 113, and makes backward movement difficult.

When the wheel 113 moves forward and enters the rail 8, the wheel 113 climbs the inclined surface 861 and moves down to the passage 81 when passing over the top portion 862. In this process, since the wheel 113 is in a state where the turning portion 96 is on the front side in the traveling direction and the shaft 95 is on the rear side, so that the wheel 113 can move forward smoothly without swinging the head thereof.

Conversely, when the wheel 113 moves backward (toward a left side in the drawing) from the state shown in FIG. 11, the turning portion 96 is positioned behind the wheel 113 in the traveling direction, and thus the wheel 113 is likely to turn. When the wheel 113 turns, that is, the head is swung, the wheel 113 collides with the side wall 82 or the side wall 83 and cannot be smoothly separated from the rail 8. The protruding portion 86 is provided to make it easier for the wheel 113 to turn and to make it difficult to be separated from the rails 8 by moving backward.

Next, when the wheel 113 moves forward (toward a right side in the drawing) from the state shown in FIG. 12, the turning portion 96 is positioned in front of the wheel 113 in the traveling direction, and thus the wheel 113 is difficult to turn. When the head of the wheel 113 is hard to swing, the wheel 113 can fall down on the inclined surface 861 by passing over the level difference 863 and the top portion 862 and is easily separated from the rail 8.

With such a structure, the cart POS 100 is difficult to be separated from the rail 8 by moving backward, but can be easily separated by moving forward.

When the cart POS 100 moves forward on the passage 81 and is separated from the rail 8, the upper step portion 831 comes out of the recessed portion 511 of the terminal accommodating portion 51, and then the wheel 113 is separated from the lower step portion 832. The movement of the power receiving terminals 52 and the arm portion 53 in the process is opposite to the movement described in the above first to third stages. That is, the arm portion 53 pulled by the biasing member 54 moves in the positive direction of the X axis as the roller 531 rolls on the inclined surface 84 of the upper step portion 831 on an outlet side, and returns into the terminal accommodating portion 51.

As described above, according to the structure of the present embodiment, the wheel 113 can easily enter and leave the rail 8 only by moving forward, and hardly moves backward. Therefore, the cart POS 100 can be held on the rail 8 in the first-in-first-out manner. Therefore, the cart POS 100 held on the rail 8 first is used earlier than the cart POS 100 held on the rail 8 later. As a result, the cart POS 100 charged for a longer time can be used by a customer.

Since the ends of the lower step portions 822 and 832 protrude longer than the ends of the upper step portions 821 and 831, the power receiving terminals 52 are accommodated in the terminal accommodating portion 51 and the terminal accommodating portion 51 does not interfere with the upper step portions 821 and 831 at the time of vertical movement when the wheel 113 passes over the protruding portion 86. Accordingly, it is possible to prevent the inconvenience such as the power receiving unit 5 being damaged by hitting the rail 8 that is caused by the vertical movement of the cart POS 100 when the wheel 113 passes over the protruding portion 86.

(Modification)

The above-described embodiment can be appropriately modified and implemented by changing a part of the configuration or function of each of the above-described devices. For example, although the cart POS 100 is described as an example of a moving device in the above embodiment, in practice, the moving device may not be the cart POS 100 but may be a moving body formed to be movable with a wheel or the like, and may be a device that operates by electric power supply from the mounted secondary battery 4. As a specific example of the moving device, a device that moves on a floor surface by rotation of a wheel in contact with the floor surface, such as a self-traveling robot device or a handcart type device having a function (assist function) of assisting a force for moving, may be considered.

In the embodiment described above, the arm portion 53 includes the roller 531, but in practice, the arm portion 53 may not include the roller 531, and a portion of the roller 531 may be formed by a curved surface or the like that can smoothly slide on the inclined surface 84.

In the above embodiment, one rear wheel 113 is held in one rail 8, but in practice, there may be a rail that holds the other rear wheel 114. In this case, the power transmitting unit 6 may be provided on only one rail 8, or both rails may include the power transmitting unit 6. Further, if both rails include the power transmitting unit 6, the positive electrode and the negative electrode may be provided on different rails. Further, in this case, the position where the power transmitting terminal is provided in the terminal receiving portion 61 may be either the upper surface or the lower surface of the terminal receiving portion 61.

In the above embodiment, an operator of the cart POS 100 such as a customer needs to operate the cart POS 100, so that the wheel 113 is held in the rail 8. In order to assist the handling of the cart POS 100 at that time, for example, it is considered preferable to draw an outline of the cart 1 in a plan view on the floor surface and indicate the movement direction of the cart 1 with an arrow or words, or provide some guidance.

While certain embodiments disclosed here have been described, the embodiment has been presented by way of example only, and is not intended to limit the scope of the disclosure. These novel embodiments may be implemented in a variety of other forms; various omissions, substitutions, and changes may be made without departing from the spirit of the disclosure. The embodiments and the modifications thereof fall within the scope and spirit of the disclosure and are included in the scope of the disclosures recited in the claims and the equivalent thereof.

What is claimed is:

1. A moving device power feeding device, comprising:
   a rail including a passage through which a wheel of a moving device passes, and a pair of side walls positioned with the passage interposed therebetween;
   a container-shaped terminal accommodating portion disposed on a front side or a rear side in a traveling direction of the wheel that passes between the pair of side walls, and attached to the moving device;
   a power receiving terminal configured to receive electric power to be fed to a secondary battery mounted on the moving device, and provided to be movable along a width direction of the moving device between a first position where the power receiving terminal is accommodated in the terminal accommodating portion and a second position where the power receiving terminal is separated from the terminal accommodating portion;

a groove-shaped terminal receiving portion provided in one of the side walls, and into which the power receiving terminal configured to move along the width direction of the moving device is inserted; and one or more power transmitting terminals disposed on a surface, inside the terminal receiving portion, on which the power receiving terminal slides during movement, presenting over a longitudinal direction of the rail, and configured to come into contact with the power receiving terminal to transmit electric power to the power receiving terminal.

2. The moving device power feeding device according to claim 1, wherein
the rail includes a protruding portion protruding upward at an inlet/outlet of the passage, and a height of the protruding portion is less than a radius of the wheel.

3. The moving device power feeding device according to claim 1, wherein
the side wall includes
an upper step portion configured to restrict movement of the terminal accommodating portion in the width direction, and
a lower step portion positioned below the upper step portion and configured to restrict movement of the wheel in the width direction, an end portion of the lower step portion protruding longer than an end portion of the upper step portion in the longitudinal direction of the rail.

4. The moving device power feeding device according to claim 1, further comprising:
an arm portion that is movable along the width direction of the moving device between the first position and the second position, and to which the power receiving terminal is attached; and
a biasing member configured to bias the arm portion in a direction in which the arm portion returns to an inside of the terminal accommodating portion, wherein
the terminal accommodating portion includes an engaging portion configured to be slidably engaged with an upper side of the side wall.

5. The moving device power feeding device according to claim 1, wherein
the power receiving terminal has a configuration in which a positive electrode terminal is disposed on one of upper and lower surfaces of an arm portion that enters and leaves the terminal accommodating portion and a negative electrode terminal is disposed on the other of the upper and lower surfaces, and
one of a negative electrode terminal and a positive electrode terminal of the power transmitting terminal is disposed on an upper surface of the terminal receiving portion, and the other of the negative electrode terminal and the positive electrode terminal is disposed on a lower surface of the terminal receiving portion.

6. The moving device power feeding device according to claim 1, wherein the rail is configured to accommodate a plurality of moving devices.

7. A power station for shopping carts, comprising:
a rail including a passage through which a wheel of a shopping cart passes, and a pair of side walls positioned with the passage interposed therebetween;

a container-shaped terminal accommodating portion disposed on a front side or a rear side in a traveling direction of the wheel that passes between the pair of side walls, and attached to the shopping cart;

a power receiving terminal configured to receive electric power to be fed to a secondary battery mounted on the shopping cart, and provided to be movable along a width direction of the shopping cart between a first position where the power receiving terminal is accommodated in the terminal accommodating portion and a second position where the power receiving terminal is separated from the terminal accommodating portion;

a groove-shaped terminal receiving portion provided in one of the side walls, and into which the power receiving terminal configured to move along the width direction of the shopping cart is inserted; and one or more power transmitting terminals disposed on a surface, inside the terminal receiving portion, on which the power receiving terminal slides during movement, presenting over a longitudinal direction of the rail, and configured to come into contact with the power receiving terminal to transmit electric power to the power receiving terminal.

8. The power station for shopping carts according to claim 7, wherein
the rail includes a protruding portion protruding upward at an inlet/outlet of the passage, and a height of the protruding portion is less than a radius of the wheel.

9. The power station for shopping carts according to claim 7, wherein
the side wall includes
an upper step portion configured to restrict movement of the terminal accommodating portion in the width direction, and
a lower step portion positioned below the upper step portion and configured to restrict movement of the wheel in the width direction, an end portion of the lower step portion protruding longer than an end portion of the upper step portion in the longitudinal direction of the rail.

10. The power station for shopping carts according to claim 7, further comprising:
an arm portion that is movable along the width direction of the shopping cart between the first position and the second position, and to which the power receiving terminal is attached; and
a biasing member configured to bias the arm portion in a direction in which the arm portion returns to an inside of the terminal accommodating portion, wherein
the terminal accommodating portion includes an engaging portion configured to be slidably engaged with an upper side of the side wall.

11. The power station for shopping carts according to claim 7, wherein
the power receiving terminal has a configuration in which a positive electrode terminal is disposed on one of upper and lower surfaces of an arm portion that enters and leaves the terminal accommodating portion and a negative electrode terminal is disposed on the other of the upper and lower surfaces, and
one of a negative electrode terminal and a positive electrode terminal of the power transmitting terminal is disposed on an upper surface of the terminal receiving portion, and the other of the negative electrode terminal and the positive electrode terminal is disposed on a lower surface of the terminal receiving portion.

12. The power station for shopping carts according to claim 7, wherein the rail is configured to accommodate a plurality of shopping carts.

13. A recharging and storage device, comprising:
  a rail including a passage through which a wheel of a point of sale (POS) cart passes, and a pair of side walls positioned with the passage interposed therebetween;
  a container-shaped terminal accommodating portion disposed on a front side or a rear side in a traveling direction of the wheel that passes between the pair of side walls, and attached to the POS cart;
  a power receiving terminal configured to receive electric power to be fed to a secondary battery mounted on the POS cart, and provided to be movable along a width direction of the POS cart between a first position where the power receiving terminal is accommodated in the terminal accommodating portion and a second position where the power receiving terminal is separated from the terminal accommodating portion;
  a groove-shaped terminal receiving portion provided in one of the side walls, and into which the power receiving terminal configured to move along the width direction of the POS cart is inserted; and
  one or more power transmitting terminals disposed on a surface, inside the terminal receiving portion, on which the power receiving terminal slides during movement, presenting over a longitudinal direction of the rail, and configured to come into contact with the power receiving terminal to transmit electric power to the power receiving terminal.

14. The recharging and storage device according to claim 13, wherein
  the rail includes a protruding portion protruding upward at an inlet/outlet of the passage, and a height of the protruding portion is less than a radius of the wheel.

15. The recharging and storage device according to claim 13, wherein
  the side wall includes
    an upper step portion configured to restrict movement of the terminal accommodating portion in the width direction, and
    a lower step portion positioned below the upper step portion and configured to restrict movement of the wheel in the width direction, an end portion of the lower step portion protruding longer than an end portion of the upper step portion in the longitudinal direction of the rail.

16. The recharging and storage device according to claim 13, further comprising:
  an arm portion that is movable along the width direction of the POS cart between the first position and the second position, and to which the power receiving terminal is attached; and
  a biasing member configured to bias the arm portion in a direction in which the arm portion returns to an inside of the terminal accommodating portion, wherein
  the terminal accommodating portion includes an engaging portion configured to be slidably engaged with an upper side of the side wall.

17. The recharging and storage device according to claim 13, wherein
  the power receiving terminal has a configuration in which a positive electrode terminal is disposed on one of upper and lower surfaces of an arm portion that enters and leaves the terminal accommodating portion and a negative electrode terminal is disposed on the other of the upper and lower surfaces, and
  one of a negative electrode terminal and a positive electrode terminal of the power transmitting terminal is disposed on an upper surface of the terminal receiving portion, and the other of the negative electrode terminal and the positive electrode terminal is disposed on a lower surface of the terminal receiving portion.

18. The recharging and storage device according to claim 13, wherein the rail is configured to accommodate a plurality of POS carts.

* * * * *